United States Patent [19]
Terasaki

[11] Patent Number: 5,691,899
[45] Date of Patent: Nov. 25, 1997

[54] AUTOMOTIVE VEHICLE SUSPENSION CONTROL SYSTEM

[75] Inventor: Hajime Terasaki, Atsugi, Japan

[73] Assignee: Unisia Jecs Corporation, Atsugi, Japan

[21] Appl. No.: 541,446

[22] Filed: Oct. 10, 1995

[30] Foreign Application Priority Data

Oct. 14, 1994 [JP] Japan .................. 6-249060

[51] Int. Cl.$^6$ .................................. B60G 17/015
[52] U.S. Cl. .................... 364/424.047; 280/707
[58] Field of Search .............. 364/424.046, 424.047, 364/424.058; 280/707

[56] References Cited

U.S. PATENT DOCUMENTS

| | | | |
|---|---|---|---|
| 4,650,212 | 3/1987 | Yoshimura | 280/707 |
| 4,673,194 | 6/1987 | Sugasawa | 280/707 |
| 4,853,860 | 8/1989 | Achenbach | 364/424.046 |
| 4,886,291 | 12/1989 | Okamoto | 280/707 |
| 4,948,163 | 8/1990 | Kikushima et al. | 280/707 |
| 5,066,041 | 11/1991 | Kindermann et al. | 280/707 X |
| 5,322,318 | 6/1994 | Kimura et al. | 280/707 X |
| 5,485,377 | 1/1996 | Sasaki et al. | 364/424.046 |

FOREIGN PATENT DOCUMENTS

| | | |
|---|---|---|
| 0 317 071 | 5/1989 | European Pat. Off. . |
| 0 488 052 | 6/1992 | European Pat. Off. . |
| 5-77624 | 3/1993 | Japan . |
| 5-077624 | 7/1993 | Japan . |

*Primary Examiner*—Collin W. Park
*Attorney, Agent, or Firm*—Foley & Lardner

[57] ABSTRACT

A suspension control system for controlling at least one shock absorber provided between sprung and unsprung masses of an automotive vehicle to provide a variable damping force characteristic. The control system includes a low pass filter for filtering out noise superimposed on an electric signal indicative of a sensed steering angle. The noise removed steering angle indicative signal is fed to a control unit operable in a normal control mode for controlling the shock absorber based on a sensed vehicle behavior to provide an optimum damping force characteristic and in a roll control mode for controlling the shock absorber based on the noise removed vehicle steering angle indicative signal to provide a damping force greater than that provided in the normal control mode. The control unit operates in the roll control mode when the noise removed steering angle indicative signal exceeds a predetermined first threshold value. The operation is changed from the roll control mode to the normal control mode a predetermined time after the noise removed steering angle indicative signal decreases below a second threshold value set in direct proportion with a peak value of the noise removed steering angle indicative signal.

2 Claims, 12 Drawing Sheets

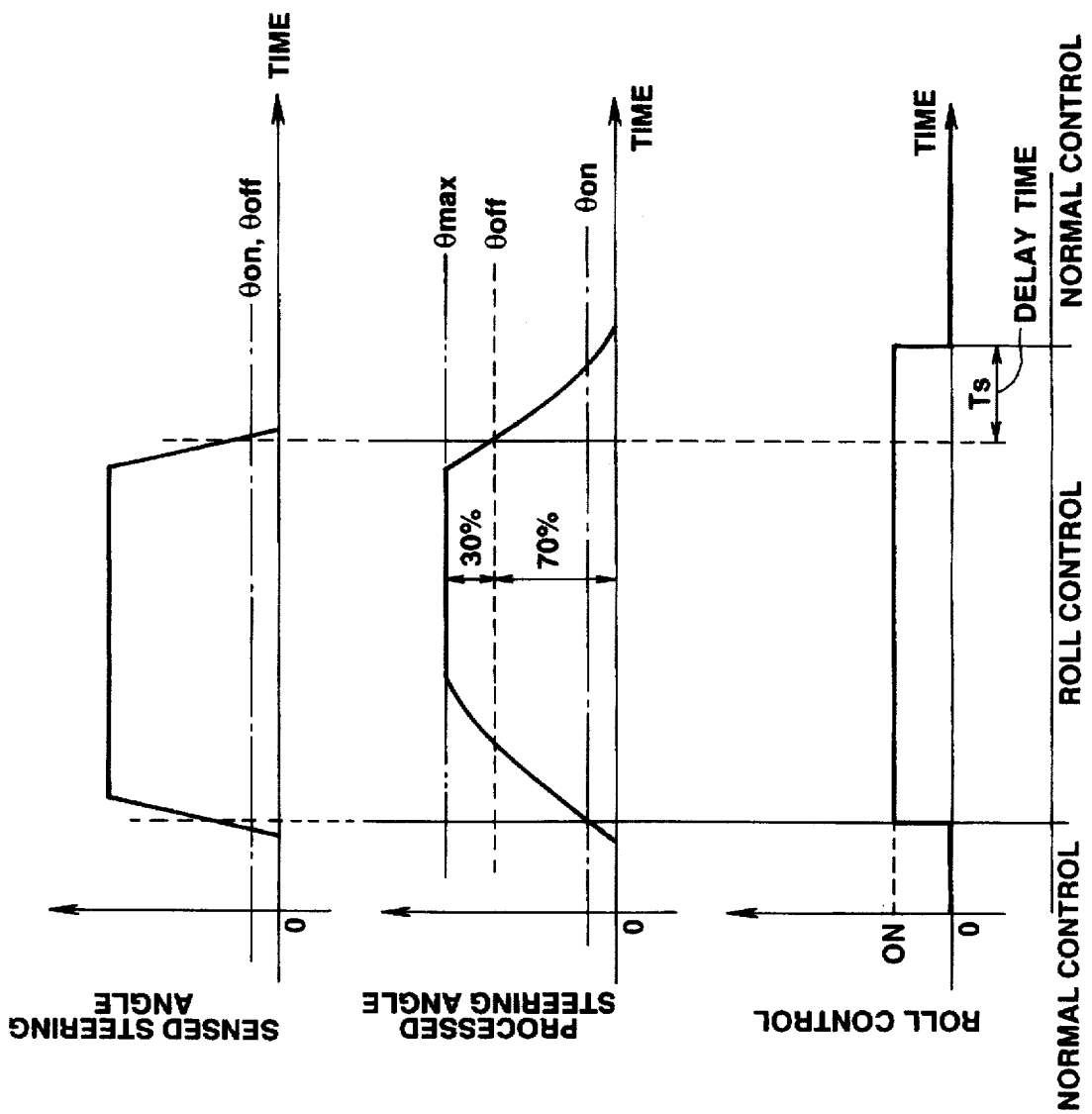

AUTOMOTIVE VEHICLE SUSPENSION CONTROL SYSTEM

BACKGROUND OF THE INVENTION

This invention relates to an automotive vehicle suspension control system and, more particularly, to a system for controlling at least one shock absorber interposed between sprung and unsprung masses to provide an optimum damping coefficient.

For example, Japanese Patent Kokai No. 5-77624 discloses such an automotive vehicle suspension control system which uses a signal fed from a steering angle sensor to detect a vehicle rolling motion. The suspension control system is arranged to operate in a roll control mode to suppress vehicle rolling motions by controlling the shock absorbers to provide an extension side hard damping force characteristic for the shock absorbers placed on one vehicle side where the vehicle is steered and a compression side hard characteristic for the shock absorbers placed on the other side of the vehicle when the sensed steering angle exceeds a predetermined threshold. A low pass filter is provided to remove noise which may be superimposed on the steering angle indicative signal fed from the steering angle sensor. The noise removed steering angle indicative signal is used to determine the times at which the roll control mode is initiated and terminated. However, the noise removed steering angle indicative signal will lag somewhat behind the sensed steering angle indicative signal. The time lag is in direct proportion to the degree to which the vehicle steering wheel is turned. For this reason, the time in which the termination of the roll control mode is delayed with respect to the sensed steering angle is variable and dependent on the degree to which the vehicle steering wheel is turned. With the conventional suspension control system, thus, a feeling of disorder is provided to the vehicle operator when the roll control mode is terminated.

SUMMARY OF THE INVENTION

It is a main object of the invention to provide an improved automotive vehicle suspension control system which can return the suspension control operation from its roll control mode to its normal control model with the same delay in time relative to the sensed steering angle regardless of the degree to which the vehicle steering wheel is turned.

There is provided, in accordance with the invention, a suspension control system for an automotive vehicle which comprises at least one shock absorber provided between sprung and unsprung masses of the vehicle to provide a variable damping force characteristic, first sensor means for sensing a behavior of the vehicle and producing a first sensor signal indicative of a sensed vehicle behavior, and second sensor means for sensing a vehicle steering angle and producing a second sensor signal indicative of a sensed vehicle steering angle. A low pass filter is provided for converting the second sensor signal into a noise removed steering angle indicative signal. The suspension control system also includes a control unit operable in a normal control mode for controlling the shock absorber based on the first sensor signal to provide an optimum damping force characteristic and in a roll control mode for controlling the shock absorber based on the noise removed vehicle steering angle indicative signal to provide a damping force greater than that provided in the normal control mode. The control unit includes means for detecting a peak value of the noise removed steering angle indicative signal, means for operating the control unit in the roll control mode when the noise removed steering angle indicative signal exceeds a predetermined first threshold value, means for setting a second threshold value in direct proportion with the detected peak value, and means for making a change from the roll control mode to the normal control mode a predetermined time after the noise removed steering angle indicative signal decreases below the second threshold value.

BRIEF DESCRIPTION OF THE DRAWINGS

The invention will be described in greater detail by reference to the following description taken in connection with the accompanying drawings, in which:

FIGS. 16A, 16B and 16C are graphs used in explaining the timing at which the control unit operation is switched between the normal and roll control modes.

DETAILED DESCRIPTION OF THE INVENTION

Figure 1:
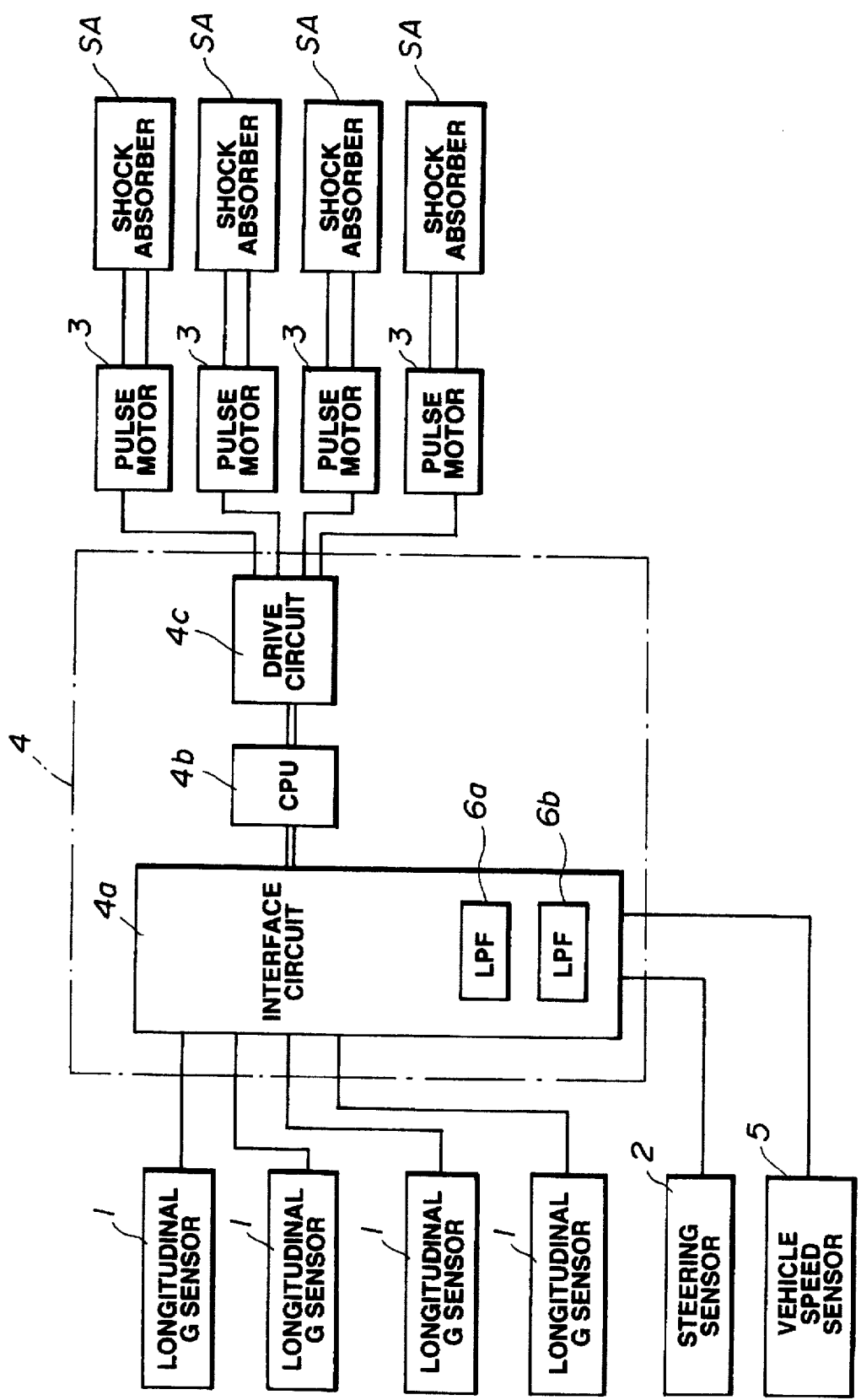
FIG. 1 is a schematic diagram showing one embodiment of an automotive vehicle suspension control system made in accordance with the invention.
Figure 2:
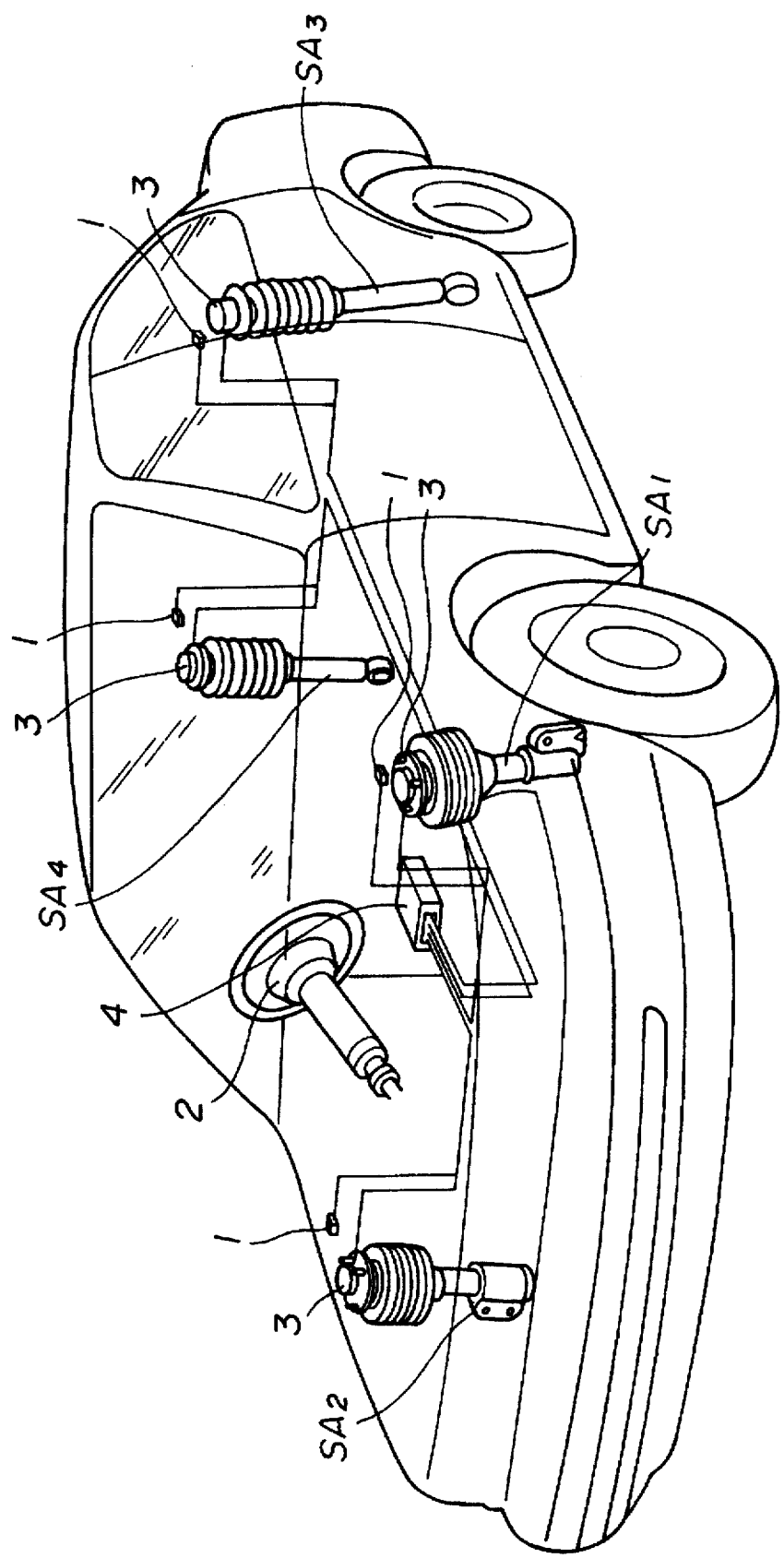
FIG. 2 is a perspective view showing shock absorbers used with an automotive vehicle.

With reference to the drawings and in particular to FIG. 1, there is shown a schematic diagram of an automotive vehicle suspension control system embodying the invention. The suspension control system is shown as including a control unit 4 for driving pulse motors 3 in a manner to provide optimum damping force characteristics for shock absorbers SA. As best shown in FIG. 2, each of four shock absorbers SA1, SA2, SA3 and SA4 is interposed between a sprung mass (vehicle body) and an unsprung mass (tire wheel). The control unit 4, which is mounted near the driver's seat (FIG. 2), includes an interface circuit 4a, a central processing unit (CPU) 4b, and a drive circuit 4c. The central processing unit 4b calculates desired damping force characteristics (in the form of damping coefficients) to be provided for the respective shock absorbers SA. These calculations are made based on signals fed thereto through the interface circuit 4a from various sensors including longitudinal G sensors 1, a steering sensor 2 and a vehicle speed sensor 5. The longitudinal G sensors 1 are mounted on the vehicle body (sprung mass) near the positions at which the respective shock absorbers are attached to the vehicle body, as shown in FIG. 2. The longitudinal G sensors 1 sense the longitudinal accelerations G of the vehicle body at the respective positions and produce sensor signals indicative of sensed longitudinal accelerations to the interface circuit 4a. The steering sensor 2, which is mounted on the steering wheel (FIG. 2), senses the angle θ of rotation of the steering wheel and produces a sensor signal indicative of sensed steering angle to the interface circuit 4a. The interface circuit 4a includes low pass filters 6a and 6b. The low pass filter 6a receives the signals indicative of the sensed longitudinal accelerations G from the respective longitudinal G sensors 1 and converts them into corresponding signals indicative of the respective sprung mass longitudinal speeds Vn. The low pass filter 6b receives the signal indicative of the sensed steering angle θ from the steering sensor 2 and processes it to remove noise which may be superimposed on the steering angle indicative signal. The processed or noise removed steering angle θf is transferred from the interface circuit 4a to the central processing unit 4b. The central processing unit 12b transfers the control word specifying the calculated damping coefficient to the drive signal generator circuit 12c which thereby produces a step drive signal to the step motor drive circuits 12e for driving a corresponding one of the step motors 3 to provide the calculated damping force characteristic.

Figure 3:
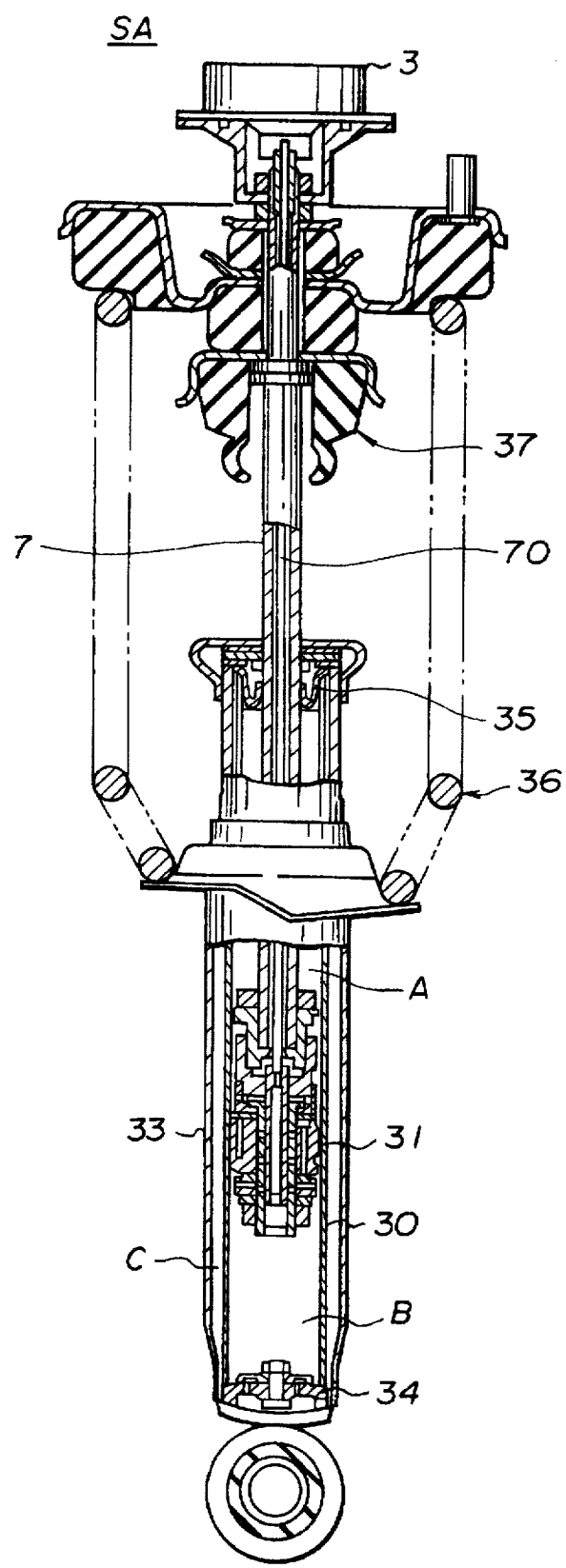
FIG. 3 is a sectional view showing the detailed structure of the shock absorber.

Referring to FIG. 3, there is shown a variable damping force type shock absorber which may be used with the suspension control system. The shock absorber SA includes a cylinder 30 and a piston 31 mounted for reciprocal motion within the cylinder 30. The piston 31 defines upper and lower chambers A and B on the opposite sides, thereof. An outer envelop 33 is placed to surround the cylinder 30 so as to define a reservoir C along therewith. A base 34 is provided to separate the reservoir C from the lower chamber B. A piston rod 7 is coupled to the piston 31 for sliding movement. The sliding movement of the piston rod 7 is guided by a guide member 35. A suspension spring 36 is seated between the outer envelop 33 and the vehicle body. The numeral 37 designates a bumper rubber member (or bushing).

Figure 4:
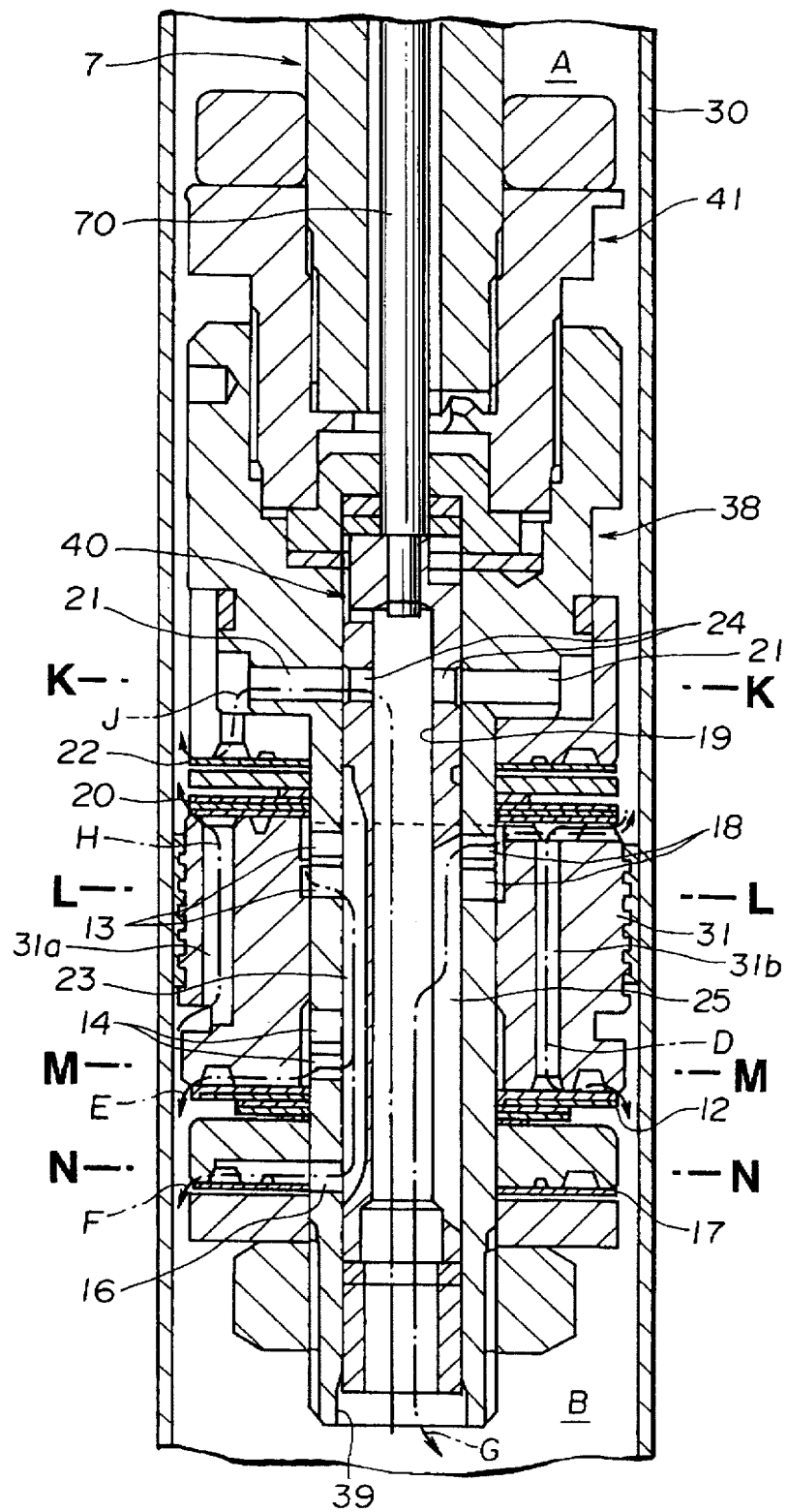
FIG. 4 is a fragmentary enlarged sectional view showing the significant portion of the shock absorber.

Referring to FIG. 4, the piston 31 has first and second passages 31a and 31b extending over the full length of the piston 31. A compression side damping valve 20 is provided in cooperation with the first passage 31a. A extension side damping valve 12 is provided in cooperation with the second passage 31b. The piston rod 7 is threadedly engaged at its tip end with a bound stopper 41. The bound stopper 41 is threadedly engaged within a stud 38 extending through the piston 31. The stud 38 is formed with a flow passage 39 connected between the upper and lower chambers A and B. Provided in cooperation of the flow passage 39 are an adjuster 40, an extension side check valve 17 and a compression side check valve 22. The adjuster 40 is drivingly associated with the corresponding one of the pulse motors 3 which rotates the adjuster through a control rod 70 (FIG. 3) to adjust the effective area of the flow passage 39. The stud 38 is formed with first, second, third, fourth and fifth ports 21, 13, 18, 14 and 16 in a descending scale. The adjuster 40 has a hollow portion 19, first and second lateral holes 24 and 25, and a longitudinal groove 23 formed in its outer peripheral surface. In this structure, thus, four flow passages are formed for connection between the upper and lower chambers A and B during extension stroke. These flow passages include an extension side first flow passage D extending from the second passage 31b through the inner side of the extension side damping valve 12 to the lower chamber B, an extension side second flow passage E extending from the second port 13 through the longitudinal groove 23 to the fourth port 14 and hence through the outer peripheral side of the extension side damping valve 12 to the lower chamber B, an extension side third flow passage F extending from the second port through the longitudinal groove 23 to the fifth port 16 and hence through the extension side check valve 17 to the lower chamber B, and a bypass passage G extending from the third port 18 through the second lateral hole 25 and the hollow portion 19 to the lower chamber B. Furthermore, three flow passages are formed for connection between the upper and lower chambers A and B during compression stroke. These flow passages include a compression side first flow passage H extending from the first passage 31a through the compression side damping valve 20, a compression side second flow passage J extending from the hollow portion 19 through the first lateral hole 24 to the first port 21 and hence through the compression side check valve 22 to the upper chamber A, and a bypass passage G extending from the hollow portion 19 through the second lateral hole 25 and the third port 18 to the upper chamber.

Figure 5:
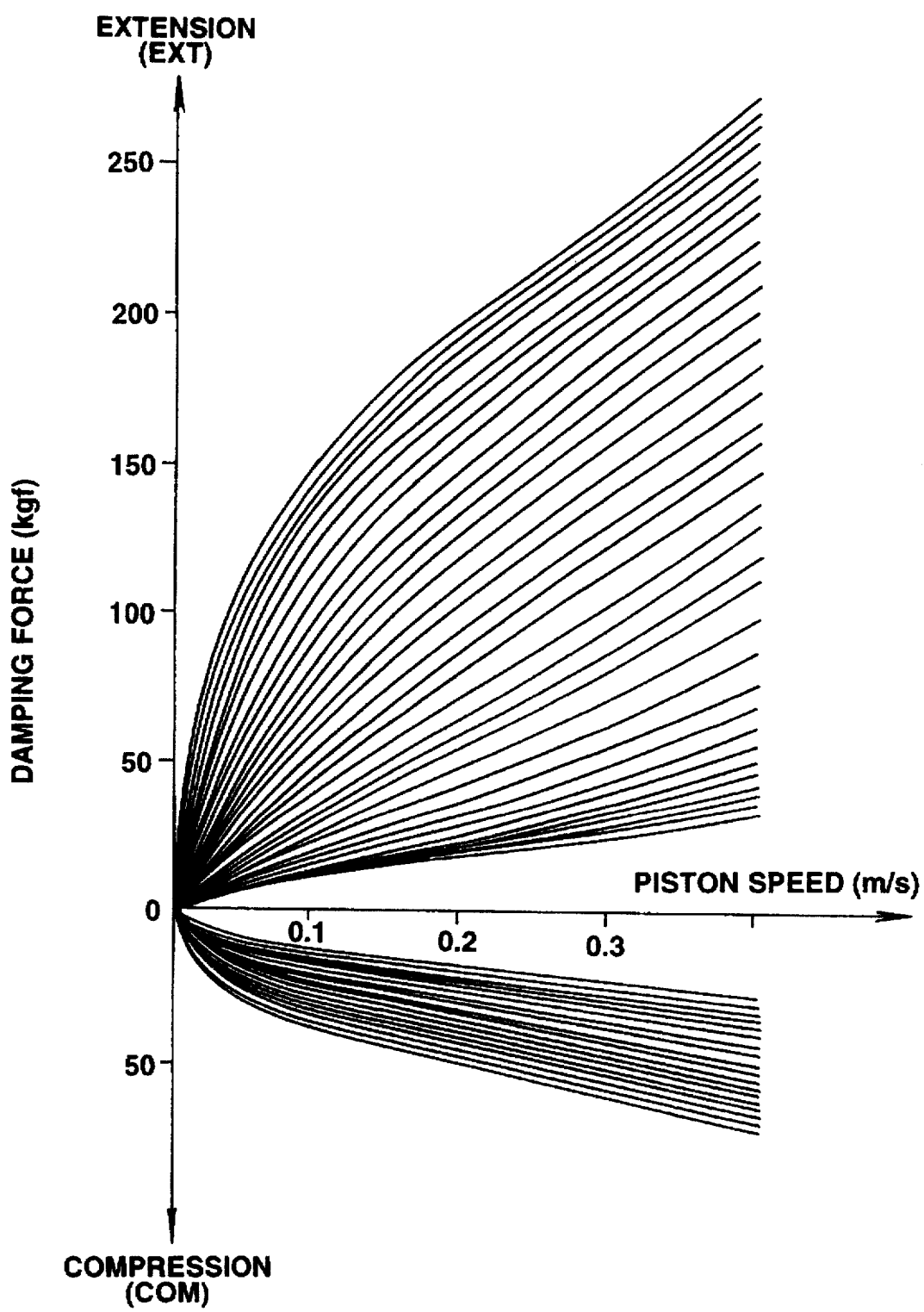
FIG. 5 is a graph of damping force versus piston speed.
Figure 6:
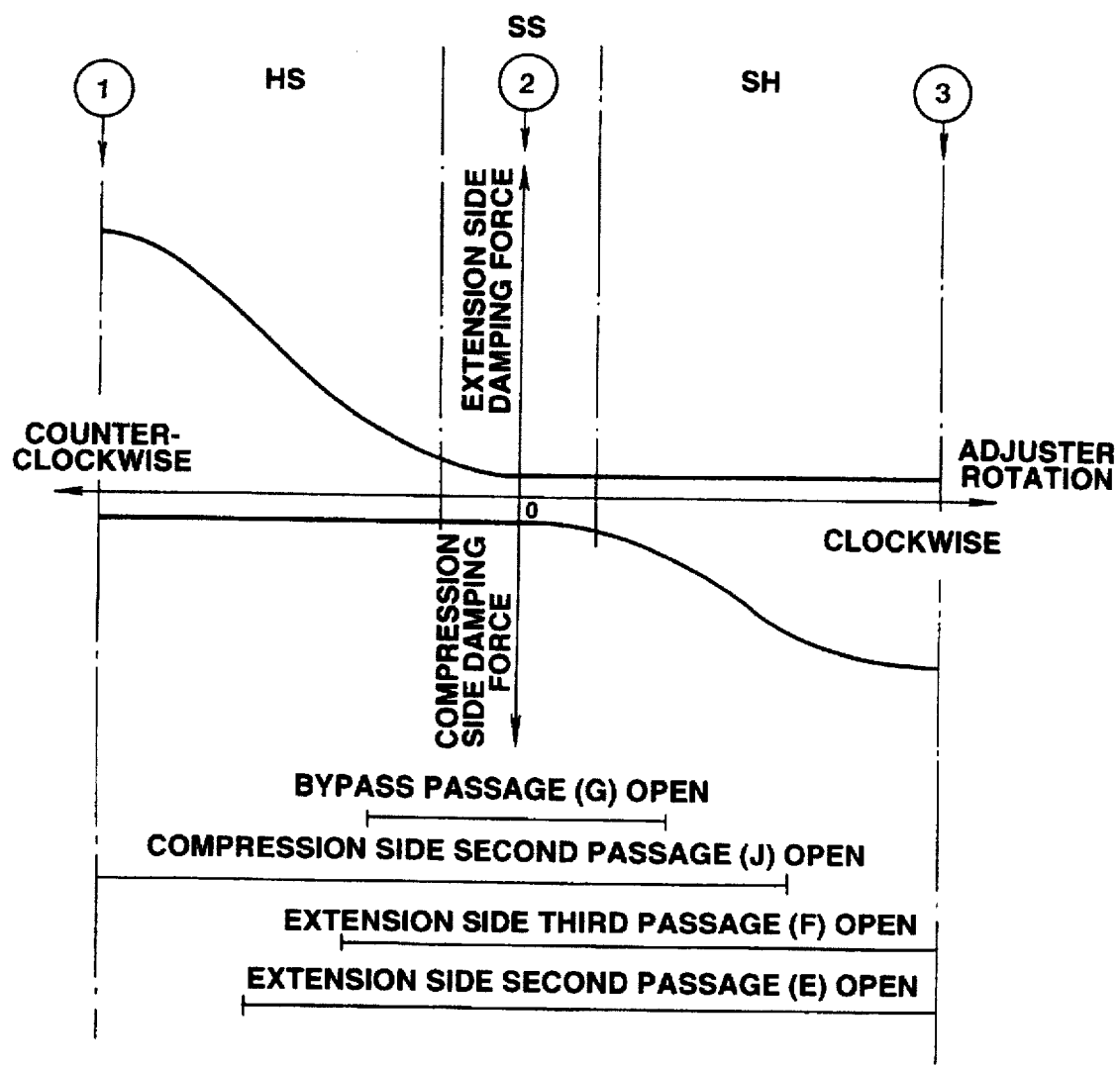
FIG. 6 is a diagram used in explaining the control ranges in which the shock absorber is operable with rotation of the adjuster placed in the shock absorber.
Figure 7A:
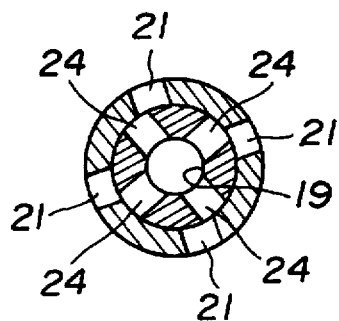
FIG. 7A is a cross-sectional view taken along the line K—K of FIG. 4 in the first position of the adjuster.
Figure 7B:
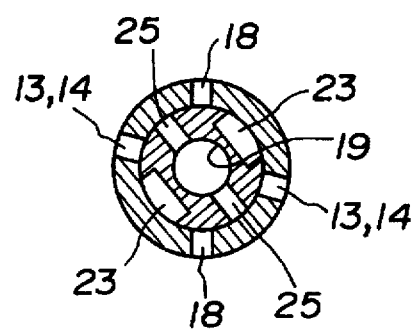
FIG. 7B is a cross-sectional view taken along the lines L—L and M—M of FIG. 4 in the first position of the adjuster.
Figure 7C:
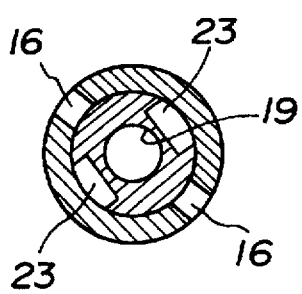
FIG. 7C is a cross-sectional view taken along the line N—N of FIG. 4 in the first position of the adjuster.
Figure 8A:
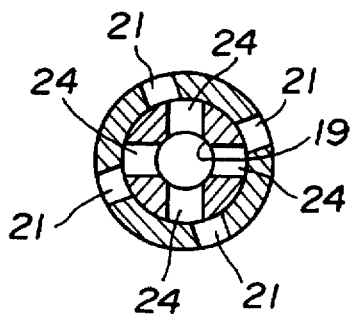
FIG. 8A is a cross-sectional view taken along the line K—K of FIG. 4 in the second position of the adjuster.
Figure 8B:
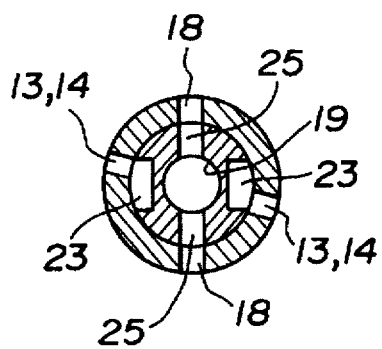
FIG. 8B is a cross-sectional view taken along the lines L—L and M—M of FIG. 4 in the second position of the adjuster.
Figure 8C:
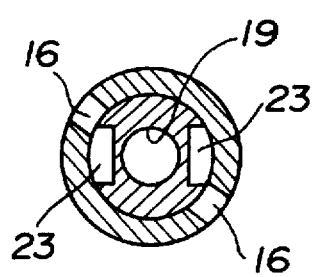
FIG. 8C is a cross-sectional view taken along the line N—N of FIG. 4 in the second position of the adjuster.
Figure 9A:
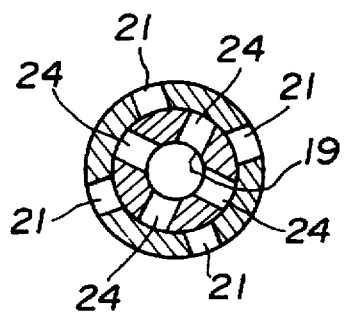
FIG. 9A is a cross-sectional view taken along the line K—K of FIG. 4 in the third position of the adjuster.
Figure 9B:
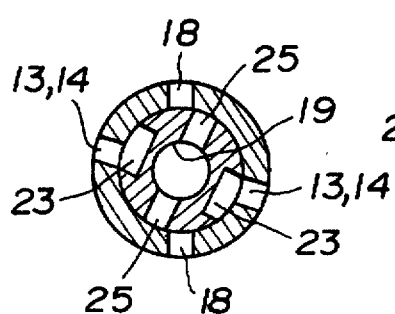
FIG. 9B is a cross-sectional view taken along the lines L—L and M—M of FIG. 4 in the third position of the adjuster.
Figure 9C:
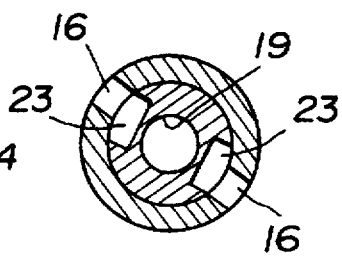
FIG. 9C is a cross-sectional view taken along the line N—N of FIG. 4 in the third position of the adjuster.
Figure 10:
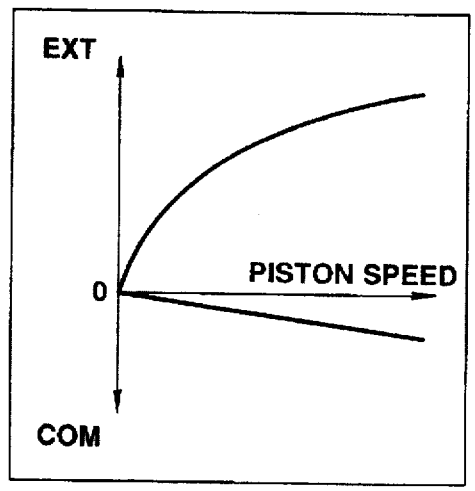
FIG. 10 is a diagram used in explaining the damping forge characteristic in the first position of the adjuster.
Figure 11:
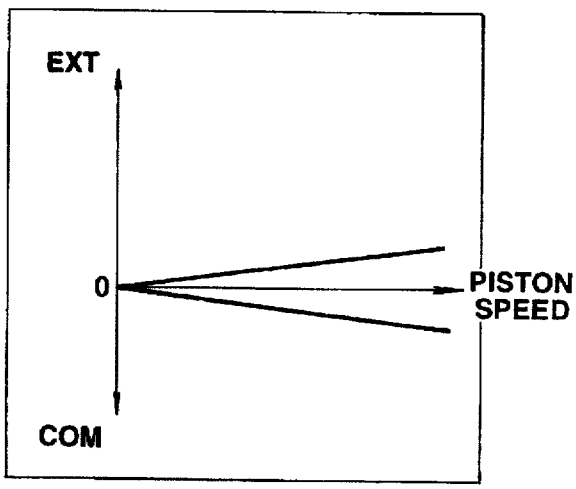
FIG. 11 is a diagram used in explaining the damping force characteristic in the second position of the adjuster.
Figure 12:
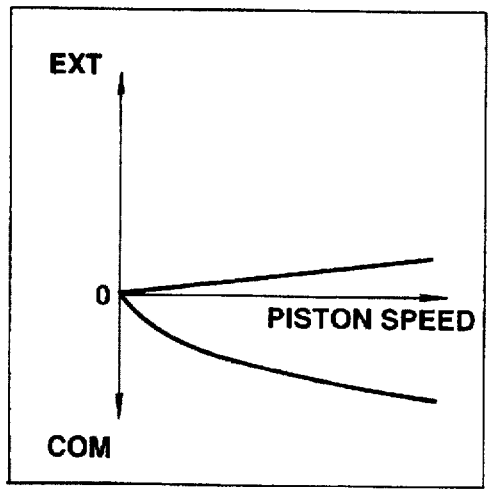
FIG. 12 is a diagram used in explaining the damping force characteristic in the third position of the adjuster.

The adjuster 40 can be rotated to adjust the damping force characteristics of the shock absorber SA in a plurality of steps on both of the extension and compression sides, as shown in FIG. 5. It is now assumed that the adjuster 40 is at a second position (2) corresponding to a soft range SS, as shown in FIG. 6, where the shock absorber SA has a soft damping force characteristic on both of the expansion and compression sides thereof. This damping force characteristic is shown in FIG. 11. In the second position (2), the components of the piston 31 are positioned as shown in FIGS. 8A, 8B and 8C. FIG. 8A is a cross-sectional view taken along the line K—K of FIG. 4, FIG. 8B is a cross-sectional view taken along the lines L—L and M—M of FIG. 4 and FIG. 8C is a cross-sectional view taken along the line N—N of FIG. 4. When the adjuster 40 rotates in a counterclockwise direction from the second position (2), the damping force characteristic of the shock absorber SA changes toward its hard characteristic side in a plurality of steps only on the extension side thereof. Eventually, the adjuster 40 comes to a first position (1) corresponding to an extension side hard range HS, as shown in FIG. 6, where the shock absorber SA has a fixed soft characteristic on the compression side thereof. This damping force characteristic is shown in FIG. 10. In the first position (1), the components of the piston 31 are positioned as shown in FIGS. 7A, 7B and 7C. FIG. 7A is a cross-sectional view taken along the line K—K of FIG. 4, FIG. 7B is a cross-sectional view taken along the lines L—L and M—M of FIG. 4 and FIG. 7C is a cross-sectional view taken along the line N—N of FIG. 4. When the adjuster 40 rotates in the clockwise direction from the second position (2), the damping force characteristic of the shock absorber SA changes toward its hard characteristic side in a plurality of steps only on the compression side thereof. Eventually, the adjuster 40 comes to a third position (3) corresponding to a compression side hard range SH, as shown in FIG. 6, where the shock absorber SA has a fixed soft characteristic on the extension side thereof. This damping force characteristic is shown in FIG. 12. In the third position (3), the components of the piston 31 are positioned as shown in FIGS. 9A, 9B and 9C. FIG. 9A is a cross-sectional view taken along the line K—K of FIG. 4, FIG. 9B is a cross-sectional view taken along the lines L—L and M—M of FIG. 4 and FIG. 9C is a cross-sectional view taken along the line N—N of FIG. 4.

Figure 13A:
FIGS. 13A, 13B, 13C and 13D are graphs used in explaining the normal control mode of operation of the control unit.
Figure 13B:
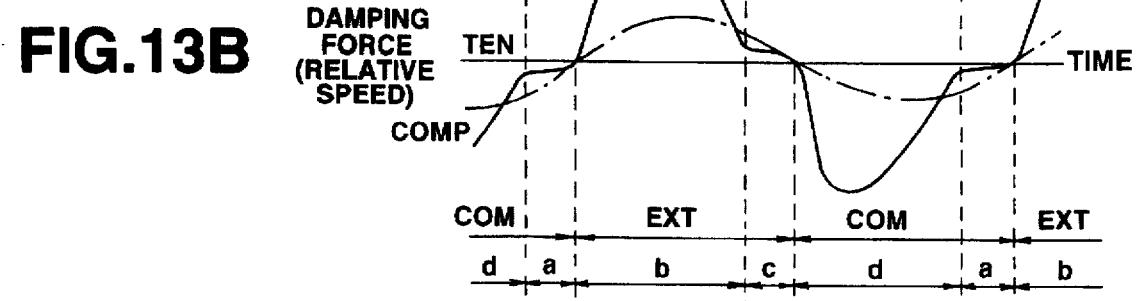
Figure 13C:
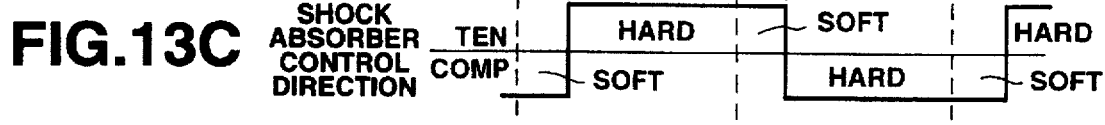
Figure 13D:
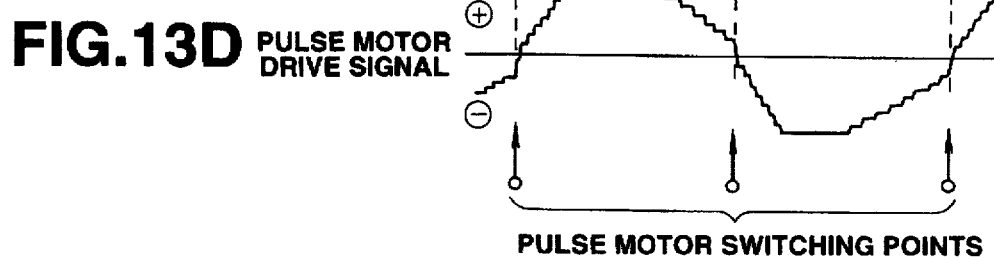
Figure 14:
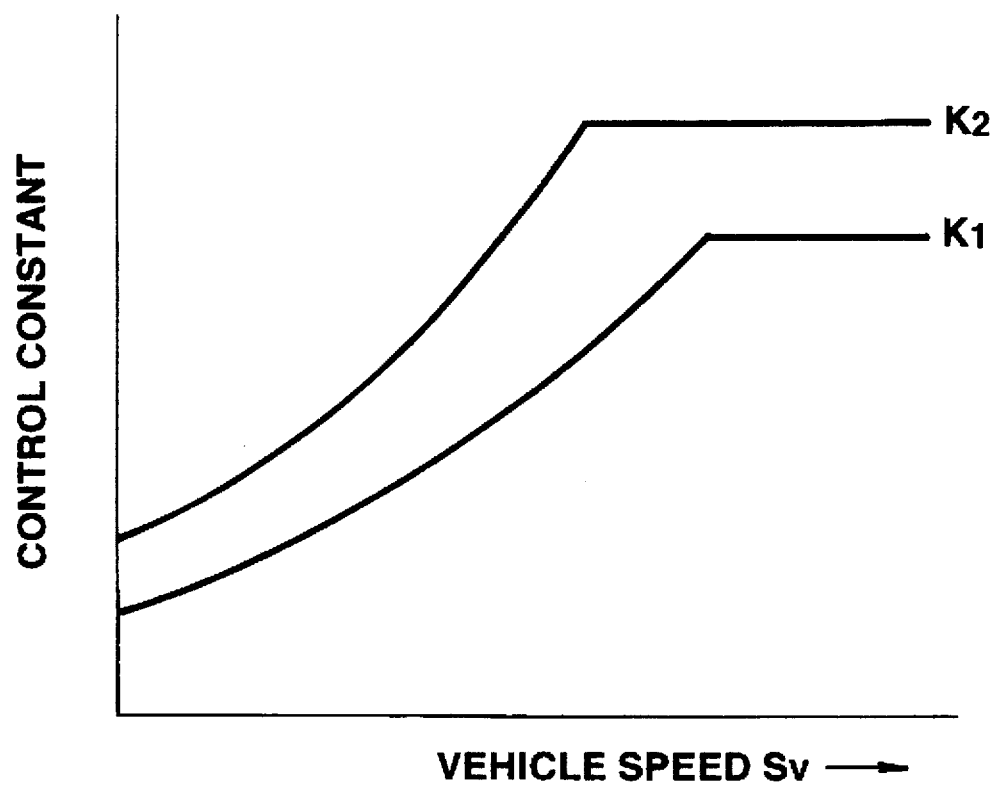
FIG. 14 is a graph of control constants versus vehicle speed.

Referring to FIGS. 13A to 13D, the normal control operation of the control unit 4 will be described. It is now assumed that the sprung mass longitudinal speed Vn changes in such a fashion as shown in FIG. 13A. When the sprung mass longitudinal speed Vn is at zero, the shock absorber SA is controlled to have a damping force characteristic placed in the soft range SS. When the sprung mass longitudinal speed Vn has a positive value, the damping force characteristic of shock absorber SA is controlled toward the extension side hard range HS. The damping force characteristic of the shock absorber SA is fixed at a low value on the compression side. The damping force characteristic of the shock absorber SA is varied in direct proportion to the sprung mass longitudinal speed Vn on the extension side. In this case, the damping force characteristic C is controlled as $C=k_1 \cdot V_n$ where $k_1$ is a normal control constant calculated as a function of vehicle speed Sv, as shown in FIG. 14. When the sprung mass longitudinal speed Vn has a negative value, the damping force characteristic of shock absorber SA is controlled toward the compression side hard range SH. The damping force characteristic of the shock absorber SA is fixed at a low value on the extension side. The damping force characteristic of the shock absorber SA is varied in direct proportion to the sprung mass longitudinal speed Vn on the extension side. In this case, the damping force characteristic C is controlled as $C=k_1 \cdot V_n$.

In the control range a where the sprung mass longitudinal speed Vn changes from a negative sign to a positive sign with the relative speed between the sprung and unsprung masses having a negative sign indicating the compression stroke (COM) of the shock absorber SA, the shock absorber SA is controlled toward the extension side hard range HS based on the sign of the sprung mass longitudinal speed Vn. In this control range, thus, the shock absorber SA is controlled to have a soft characteristic on the compression side corresponding to the present stroke of the shock absorber SA.

In the control range b where the sing of the sprung mass longitudinal speed Vn remains positive and the relative speed between the sprung and unsprung masses changes from its negative sign to its positive sign indicating the extension stroke (EXT) of the shock absorber SA, the shock absorber SA is controlled toward the extension side hard range HS based on the sign of the sprung mass longitudinal speed Vn. In this control range, thus, the shock absorber SA is controlled to have a hard characteristic in proportion to the sprung mass longitudinal speed Vn on the extension side corresponding to the present stroke of the shock absorber SA.

In the control range c where the sprung mass longitudinal speed Vn changes from its positive sign to its negative sign with the relative speed between the sprung and unsprung masses having a positive sign indicating the extension stroke (EXT) of the shock absorber SA, the shock absorber SA is controlled toward the compression side hard range SH based on the sign of the sprung mass longitudinal speed Vn. In this control range, thus, the shock absorber SA is controlled to have a soft characteristic on the extension side corresponding to the present stroke of the shock absorber SA.

In the control range d where the sign of the sprung mass longitudinal speed Vn remains negative and the relative speed between the sprung and unsprung masses changes from its positive sign to its negative sign indicating the compression stroke (COM) of the shock absorber SA, the shock absorber SA is controlled toward the compression side hard range SH based on the sign of the sprung mass longitudinal speed Vn. In this control range, thus, the shock absorber SA is controlled to have a hard characteristic on the compression side corresponding to the present stroke of the shock absorber SA.

In this embodiment, the shock absorber SA is controlled toward a hard characteristic on the side corresponding to the present stroke of the shock absorber SA when the sings of the sprung mass longitudinal speed Vn and the relative speed between the sprung and unsprung masses are the same (control ranges b and d) and toward a soft characteristic on the side corresponding to the present stroke of the shock absorber SA when the signs of the sprung mass longitudinal speed Vn and the relative speed between the sprung and unsprung masses are different (control ranges a and c). It is, therefore, possible to perform the same control as the damping force characteristic control made based on a skyhook theory with no requirement for detection of the relative speed between the sprung and unsprung masses. Furthermore, the damping force characteristic can be switched without driving the pulse motor 3 in response to a change from the region a to the region b and also to a change from the control range c to the control range d. It is, therefore, possible to reduce the damping force characteristic switching frequency as compared with the damping force characteristic control made based on the skyhook theory. This is effective to provide a faster control response and an improved pulse motor durability.

Figure 15:
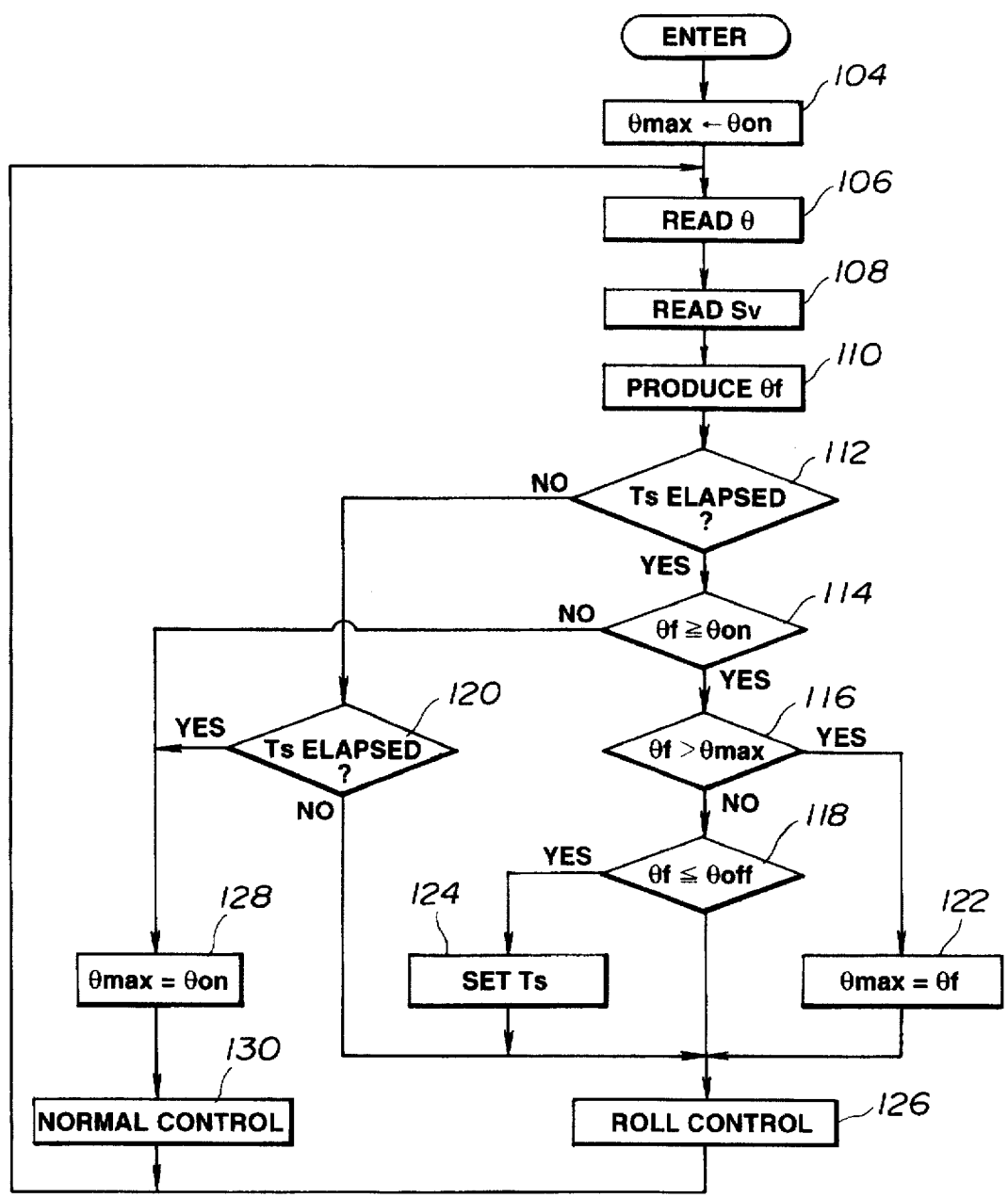
FIG. 15 is a flow diagram of the programming of the digital computer as it is used to switch the operation of the control unit between the normal roll control modes.

FIG. 15 is a flow diagram of the programming of the digital computer as it is used to switch the control operation between normal and roll control modes. When the processed steering angle $\theta f$ is equal to or greater than a first threshold value $\theta on$, it means a great degree of vehicle rolling motion resulting from a great angle of rotation of the steering wheel and the control operation is placed into a roll control mode. The control operation is switched from the roll control mode to the normal control mode a predetermined delay time Ts after the processed steering angle $\theta f$ decreases below a second threshold value $\theta off$ which may be 70 percents of the maximum value $\theta max$ of the processed steering angle $\theta f$.

The computer program is entered at the point 102. At the point 104 in the program, the maximum steering angle value $\theta max$ is initialized with an initial steering angle value $\theta on$ used as a first threshold value at which the roll control is started. At the point 106, the sensed steering angle value $\theta$ fed from the steering sensor 2 is read into the computer memory. At the point 108, the sensed vehicle speed Sv fed from the vehicle speed sensor 5 is read into the computer memory. At the point 110, a processed steering angle value θf is produced by passing the steering angle signal θ through the low pass filter 6b.

At the point 112 in the program, a determination is made as to whether or not the delay time Ts has been elapsed after the processed steering angle θf decreases below the second threshold value θoff. If the answer to this question is "yes", then the program proceeds to the point 106. Otherwise, the program proceeds to the point 120. At the point 114 in the program, a determination is made as to whether or not the processed steering angle value θf is equal to or greater than the first threshold value θon. If the answer to this question is "yes", then the program proceeds to the point 116. Otherwise, the program proceeds to the point 128. At the point 116 in the program, a determination is made as to whether or not the processed steering angle θf is greater than the maximum value θmax. If the answer to this question is "yes", then the program proceeds to the point 122. Otherwise, the program proceeds to the point 118. At the point 118, a determination is made as to whether or not the processed steering angle θf is equal to or less than the second threshold value θoff. If the answer to this question is "yes", then the program proceeds to the point 124. Otherwise, the program proceeds to the point 126 where the control operation is placed in the roll control mode. Following this, the program is returned to the point 106.

At the point 120 in the program, a determination is made as to whether or not the delay time Ts has been elapsed. If the answer to this question is "yes", then the program proceeds to the point 128. Otherwise, the program proceeds to the point 126 where the control operation is placed in the roll control mode. Following this, the program is returned to the point 106. At the point 128 in the program, the maximum value θmax is initialized with the first threshold value θon. Upon completion of this initialization, the program proceeds to the point 130 where the control operation is placed in the normal control mode. Following this, the program is returned to the point 106.

At the point 122 in the program, the maximum value θmax is updated by the processed steering angle θf. Upon completion of this maximum value updating step, the program proceeds to the point 126 where the control operation is placed in the roll control mode. Following this, the program is returned to the point 106.

At the point 124 in the program, the roll control delay time Ts is set for starting the passage of the roll control delay time Ts. Upon completion of this delay time setting step, the program proceeds to the point 126 where the control operation is placed in the roll control mode. Following this, the program is returned to the point 106.

Referring to FIGS. 16A, 16B and 16C, the operation of the suspension control system of the invention will be described further. When the steering wheel is turned through such a small angle that the processed steering angle θf is less than the first threshold value θon, the control operation is placed in the normal control mode. During the normal control mode, the shock absorber SA is controlled to have a damping force characteristic C calculated as C=k1·Vn where k1 is a normal control constant calculated as a function of vehicle speed Sv, as shown in FIG. 14. The normal control constant k1 is set to ensure good driving feel when the vehicle is moving in a straight line.

When the steering wheel is turned through such a great angle that the processed steering angle θf is equal to or greater than the first threshold value θon, the control operation is placed in the roll control mode. During the normal control mode, the shock absorber SA is controlled to have a damping force characteristic C calculated as C=k2·Vn where k2 is a roll control constant calculated as a function of vehicle speed Sv, as shown in FIG. 14. The roll control constant k2 is set at a value greater than the normal control constant k1 to suppress vehicle rolling motion when the vehicle is moving in a circle.

The vehicle rolls to the left when the steering wheel is turned in the clockwise direction. In this case, the sprung mass longitudinal speed Vn on the side of the right road wheel of the vehicle has a positive sign, whereas the sprung mass longitudinal speed Vn on the side of the left road wheel of the vehiclve has a negative sign. For this reason, the shock absorbers SA2 and SA4 associated with the right road wheels of the vehicle are controlled toward the extension side hard range HS, that is, to have a hard characteristic on the extension side corresponding to the present stroke of the shock absorbers SA2 and SA4, whereas the shock absorbers SA1 and SA3 associated with the left road wheels of the vehicle are controlled toward the compression side hard range SH, that is, to have a hard characteristic on the compression side corresponding to the present stroke of the shock absorbers SA1 and SA3. During this suspension control, the stroke of each of the shock absorber SA in the rolling direction is suppressed with the damping force characteristic greater than the damping force characteristic provided when the vehicle is moving in a straight line. It is, therefore, possible to suppress the rolling motion of the vehicle to the left.

The vehicle rolls to the right when the steering wheel is turned in the counter-clockwise direction. In this case, the sprung mass longitudinal speed Vn on the side of the right road wheel of the vehicle has a negative sign, whereas the sprung mass longitudinal speed Vn on the side of the left road wheel of the vehicle has a positive sign. For this reason, the shock absorbers SA2 and SA4 associated with the right road wheels of the vehicle are controlled toward the compression side hard range SH, that is, to have a hard characteristic on the compression side corresponding to the present stroke of the shock absorbers SA2 and SA4, whereas the shock absorbers SA1 and SA3 associated with the left road wheels of the vehicle are controlled toward the extension side hard range HS, that is, to have a hard characteristic on the extension side corresponding to the present stroke of the shock absorbers SA1 and SA3. During this suspension control, the stroke of each of the shock absorber SA in the rolling direction is suppressed with the damping force characteristic greater than the damping force characteristic provided when the vehicle is moving in a straight line. It is, therefore, possible to suppress the rolling motion of the vehicle to the right.

During the suspension control, the damping force characteristic on the stroke side of the shock absorber SA opposite to the direction (sign) of the sprung mass longitudinal speed Vn is set to provide a soft characteristic so as to absorb road inputs caused by the vehicle rolling motion. This is effective to improve the driving feel during the roll control. The control operation is switched from the roll control mode to the normal control mode when the predetermined time delay time Ts has been elapsed after the processed steering angle value θf decreases below the second threshold value θoff. The second threshold value θf may be set at a value corresponding to 70 percents of the peak or maximum value θmax of the processed steering angle θf. Since the second threshold value θoff is set at a value directly proportional to the peak value of the processed steering angle θf, it is possible to terminate the roll control mode with the same delay time or timing with respect to the actual steering angle θ regardless of the degree to which the steering wheel is turned.

While the invention has been described in connection with shock absorbers SA of the type having its damping force characteristic fixed on a soft side (or its damping coefficient fixed at a low value) on one of the compression and extension stroke sides when the damping force characteristic is controlled on the other stroke side, it is to be understood that the shock absorbers SA may be arranged to have its damping force characteristic variable on both of the compression and extension stroke sides. While the vehicle behavior is represented by the sprung mass longitudinal speed, it is to be understood that it may be represented by other parameters including the relative speed between sprung and unsprung masses and the like singly or in combination with the sprung mass longitudinal speed.

While this invention has been described in conjunction with a specific embodiment thereof, it is evident that many alternatives, modifications and variations will be apparent to those skilled in the art. Accordingly, it is intended to embrace all alternatives, modifications and variations that fall within the scope of the appended claims.

What is claimed is:

1. A suspension control system for an automotive vehicle, comprising:

at least one shock absorber provided between sprung and unsprung masses of the vehicle to provide a variable damping force characteristic;

first sensor means for sensing a behavior of the vehicle and producing a first sensor signal indicative of a sensed vehicle behavior;

second sensor means for sensing a vehicle steering angle and producing a second sensor signal indicative of a sensed vehicle steering angle;

a low pass filter for converting the second sensor signal into a noise removed steering angle indicative signal;

a control unit operable in a normal control mode for controlling the shock absorber based on the first sensor signal to provide an optimum damping force characteristic and in a roll control mode for controlling the shock absorber based on the noise removed vehicle steering angle indicative signal to provide a damping force greater than that provided in the normal control mode, the control unit including means for detecting a peak value of the noise removed steering angle indicative signal, means for operating the control unit in the roll control mode when the noise removed steering angle indicative signal exceeds a predetermined first threshold value, means for setting a second threshold value in direct proportion with the detected peak value, and means for making a change from the roll control mode to the normal control mode a predetermined time after the noise removed steering angle indicative signal decreases below the second threshold value.

2. The suspension control system as claimed in claim 1, wherein the control unit including means for setting the second threshold value at about 70% of the detected peak value.

* * * * *